(12) United States Patent
Toole (10) Patent No.: US 6,307,193 B1
(45) Date of Patent: Oct. 23, 2001

(54) COOKING VESSEL WITH ADJUSTABLE VENTILATION SYSTEM

(75) Inventor: Joan C. Toole, Lake Forest, IL (US)

(73) Assignee: Microwave Magic Company, Inc., Lake Forest, IL (US)

( * ) Notice: Subject to any disclaimer, the term of this patent is extended or adjusted under 35 U.S.C. 154(b) by 0 days.

(21) Appl. No.: 09/631,111

(22) Filed: Aug. 2, 2000

(51) Int. Cl.[7] ........................................ H05B 6/80
(52) U.S. Cl. ............... 219/735; 219/725; 99/DIG. 14; 126/386.1
(58) Field of Search ...................... 219/725, 731, 219/734, 732, 735; 99/DIG. 14, 446; 426/113, 102, 234, 243; 126/369, 373.1, 377.1, 384.1, 389.1, 386.1

(56) References Cited

U.S. PATENT DOCUMENTS

| | | | |
|---|---|---|---|
| 2,742,850 | * 4/1956 | Fond | 99/446 |
| 3,982,476 | * 9/1976 | McLane | 99/339 |
| 4,587,947 | * 5/1986 | Tomita | 126/25 R |
| 4,814,568 | * 3/1989 | Keefer | 219/725 |
| 5,012,061 | 4/1991 | Lesser . | |
| 5,387,781 | 2/1995 | Berkoff . | |
| 5,396,052 | 3/1995 | Petcavich et al. . | |
| 5,750,967 | * 5/1998 | Sprauer, Jr. | 219/735 |
| 5,996,574 | * 12/1999 | Loyd et al. | 126/389.1 |
| 6,125,842 | * 10/2000 | Loyd et al. | 126/389.1 |

OTHER PUBLICATIONS

The Fish and Poultry Cooker (1990 by Joan Toole) Manufactured and distributed by Eagle Affiliates, Healthy . . . .

* cited by examiner

*Primary Examiner*—Tu Ba Hoang
(74) *Attorney, Agent, or Firm*—Knechtel, Demeur & Samlan

(57) ABSTRACT

A cooking vessel with a unique adjustable ventilation system for cooking various foods and obtaining desired tastes. The cooking vessel has a lid and a base with a free standing rack located in the bottom of the base. The lid is designed with an ventilation system that traverses an upper ventilation cap with either a lower ventilation cap or, alternatively, a recess to enable the positional alignment of ventilation holes in the upper ventilation cap to the ventilation holes in the lower ventilation cap or, alternatively, recess to permit the proper degree of steam to be released from the cooking vessel while retaining the proper amount of moisture to effectively cook the food.

19 Claims, 11 Drawing Sheets

COOKING VESSEL WITH ADJUSTABLE VENTILATION SYSTEM

I. FIELD OF THE INVENTION

The present invention relates to cooking vessels and, more particularly, to a cooking vessel that provides a unique adjustable ventilation system which uses variable positioning of ventilation holes to modify and regulate the degree of steam released from the cooking vessel during cooking and, thereby, retains the perfect mixture of moisture to obtain the desired cooking results of various foods and tastes.

II. BACKGROUND AND SUMMARY OF THE INVENTION

Microwave and micro-convection cooking results in the innate problem of uneven cooking. As water attracts microwave energy, food that contains or is located adjacent to higher concentrations of water absorbs greater amounts of heat and becomes overcooked. In an attempt to achieve improved cooking results, cooking vessels have been designed with vent holes to allow the steam to escape from the cooking vessel and, thereby, reduce the amount of moisture in the cooking vessel that results in overcooking.

An example of such a cooking vessel is seen in U.S. Pat. No. 5,396,052 to Petcavich et al. entitled "Ceramic Utensil For Microwave Cooking" in which a utensil to prepare foods in a microwave oven is disclosed. The utensil has an open top ceramic vessel to receive foodstuff to be cooked and a microwave transparent ceramic cover for the vessel. The cover of the vessel and/or the upper regions of the side walls of the vessel are provided with one or more holes for venting water vapor from the interior of the vessel. A shortcoming of this utensil is that the vent holes permit the release of a constant amount of water vapor for all foodstuff. However, as not all foodstuff requires the same amount of moisture for desired cooking, this utensil continues to unevenly cook foodstuff. Another shortcoming of this utensil is that the cover is permanently designed to permit the release of water vapor from the interior of the vessel. As a result, this utensil is not capable of properly cooking foodstuff which necessitates the maximum amount of moisture for tenderness and to alleviate undesired dryness. Still another shortcoming is that this utensil does not provide adjustable vent holes and, therefore, is not capable of regulating or varying the release of the water vapor to tailor the cooking for individual foodstuff. This utensil, thus, lacks the versatility to accommodate the subtle distinctions for properly and efficiently cooking or reheating various foodstuffs.

Another example of a cooking vessel that suffers from the same shortcomings caused by the use of various types of non-adjustable vent holes is seen in U.S. Pat. No. 5,387,781 to Berkoff entitled "Vented Food Cooking System For Microwave Ovens". This patent discloses a hood that is provided with a multiplicity of steam vent openings in the hood. The hood is also provided with air holes in the side of the hood to permit replacement air into the hood to replace that air that escaped with the steam. Likewise, U.S. Pat. No. 5,012,061 to Lesser entitled "Microwave Safety Lid" discloses a cover adaptable to cooking vessels for use in microwave ovens. The cover includes a patterned array of openings to permit venting of vapors and gases and to reduce certain local hot spots typical in microwave heating.

A precursor to adjustable vents in cooking vessels and the present invention is seen in Applicant's "The Fish and Poultry Cooker©" manufactured and distributed by Eagle Affiliates, Healthy Lifestyle Product Line which is also seen in U.S. Provisional Patent Application No. 60/064,603 to Toole entitled "Cooking Vessel". The cooking vessel is provided with a base and a lid. The lid is provided with in adjustable vent situated in the top of the lid. The vent has one large vent hole and a cluster of approximately eighteen (18) small holes which, either individually or in combination, permit steam to escape through the lid during cooking when not closed by a cover. This cooking vessel, however, has several inherent shortcomings that make it unsuitable for present day cooking and tastes. First, although the cooking vessel circumvents the shortcomings of the cooking vessels with non-adjustable vents, this cooking vessel only provides a limited improvement. The large vent hole and the approximately eighteen small holes are adjustable from one to the other but are not capable of releasing the appropriate amount of steam to retain the perfect mixture of moisture to effectively cook the food. Second, the one large vent is too large and, thereby, permits the release of steam too quickly. The food, thus, simultaneously becomes drier and results in uneven cooking. Third, although the approximately eighteen small holes are designed to release a continuous flow of steam, the holes are positioned in a cluster and, therefore, not positioned to efficiently modify or regulate the steam for individual foods and tastes. Fourth, the combination of the large vent and the small holes are not easily adaptable by the cover to obtain the proper mixture of moisture for individual foods. Fifth, the combination of the large vent and small holes provide an imprecise measurement and an inferior ventilation system to cook the broad spectrum of delicate to harder foods. Lastly, the lid does not provide for the adjustable vent to be releasably attached to the lid and, thereby, provide the user the ability to replace the adjustable vent if necessary.

Applicant's unique lid with ventilation system solves the vent problems of the cooking vessels by providing the user with a ventilation system that assures efficient and proper cooking or reheating of food. The inventive design can be further differentiated from other cooking vessels by the following specifications:

(1) the cooking vessel must be oval or circular in shape in order to provide maximum microwave energy distribution;

(2) the ratio of base to height is preferably 11.5 to 12.5;

(3) the unique venting system in the lid creates optimum circulation for the steam which attracts microwave energy, creating a more regulated cook or reheat pattern; and (4) the rack within the cooking vessel has legs which retain the rack approximately one half of an inch above the floor of the cooking vessel. This allows the moisture to capture the microwave energy and circulate more evenly around the food.

Materials usable in microwave, micro-convection and conventional ovens are preferable for making the cooking vessel. Ceramics, a general term for pottery, stoneware and porcelain, or tempered glass bakeware are preferred as both materials can withstand the temperatures found in the referenced environments. An acceptable alternative material for stove top cooking would be metal. Nonetheless, ceramics and tempered glass allows for more versatility in appliance selection. The available standard and compact sizes ensure an easy fit into virtually all sizes of microwave, micro-convection and conventional ovens.

The lid must have an adjustable steam ventilation system on the top to adjust and regulate moisture density within the cooking vessel while the food is cooking. The vent has a series of positions for the food being cooked which allows the cook to select a vent closed position which retains the most moisture within the vessel, various adjustable positions in which the vents are partially opened, to a dry atmosphere in which the vents are fully opened. The lid or top fits securely on the top of the base in such a manner with lip configuration so that the excess steam drips back into the cooker base. The rack used to hold food above the bottom of the cooking vessel should be raised approximately one half of an inch above the bottom or floor.

III. OBJECTS OF THE INVENTION

It is the primary object of the present invention to provide a cooking vessel with an adjustable ventilation system to obtain desired cooking results for various foods and tastes. A related object of the present invention is to provide a cooking vessel with a lid that houses the adjustable ventilation system.

Another object of the present invention is to provide an adjustable ventilation system that uses the combination of various sized holes to modify and regulate the release of steam and provide the retention of moisture within the cooking vessel.

Another object of the invention is to provide a cooking vessel that is shaped to maximize the distribution of microwave energy.

Still another object of the invention is to provide a cooking vessel that is capable of cooking various foods in conventional and microwave ovens.

Still another object of the invention is to provide an adjustable ventilation system that is releasably secured to the cooking vessel.

Other objects of the present invention will become more apparent to persons having ordinary skill in the art to which the present invention pertains from the following description taken in conjunction with the accompanying drawings.

IV. BRIEF DESCRIPTION OF THE DRAWINGS

The Description of the Preferred Embodiment will be better understood with reference to the following figures.

V. DETAILED DESCRIPTION OF THE PREFERRED EMBODIMENT

Figure 1:
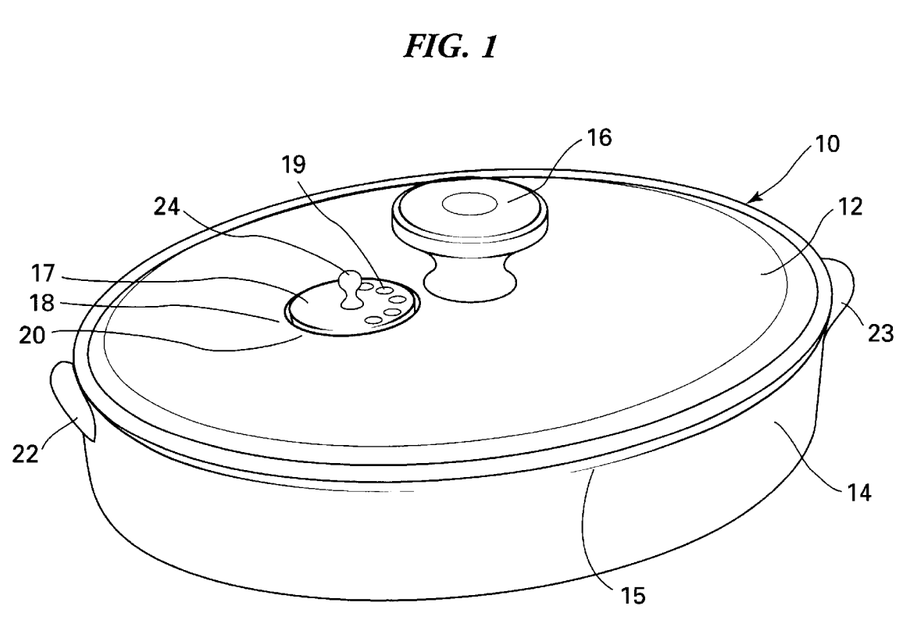
FIG. 1 is a perspective view of the present invention illustrating the cooking vessel with the adjustable ventilation system.

Turning first to FIG. 1, there is illustrated a cooking vessel 10 having a lid 12 and a base 14. A top knob handle 16 is placed in the center of the lid 12 and used to remove the lid 12 from the base 14. The base 14 has a bottom flange 15 which extends outward from its top edge and around the periphery of the base 14 (see FIG. 4). The base 14 has indented handles 22 and 23 located on the exterior sides of the cooking vessel 10 for ease in handling. The cooking vessel 10 is further provided with a ventilation system 13. The ventilation system 13 consists of an upper ventilation cap 17 and a lower ventilation cap 20.

The upper ventilation cap 17 is mounted in an opening 18 in the lid 12. A vent knob handle 24 extends upwardly from the center of the upper ventilation cap 17. The vent knob handle 24 provides ease in grasping and rotating the upper ventilation cap 17 with respect to the lower ventilation cap 20. Preferably, the upper ventilation cap 17 enables unlimited rotation with respect to the lower ventilation cap 20. The lower ventilation cap 20 is mounted in the opening 18 below the upper ventilation cap 17. In the preferred embodiment, the lower ventilation cap 20 is fixed or integrally molded to the lid 12, thus, preventing movement of the lower ventilation cap 20 (see FIG. 9B).

Figure 9A:
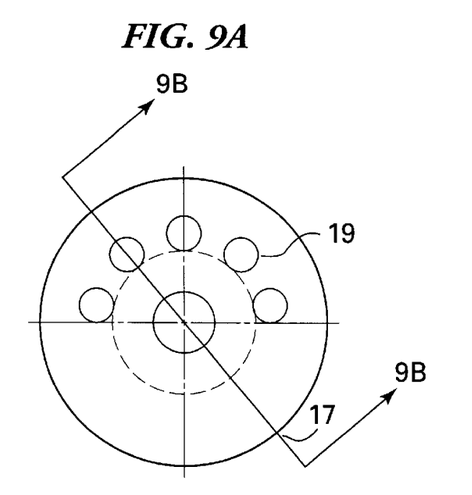
FIG. 9A is a top view of the adjustable ventilation system and the upper ventilation cap.
Figure 9B:
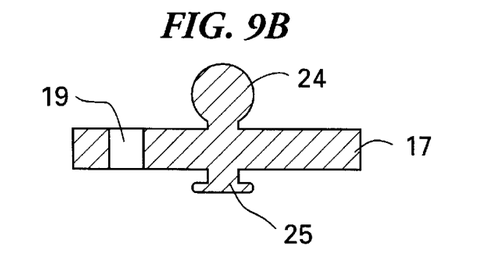
FIG. 9B is a cross sectional view taken along line 9B—9B of FIG. 9A.
Figure 9C:
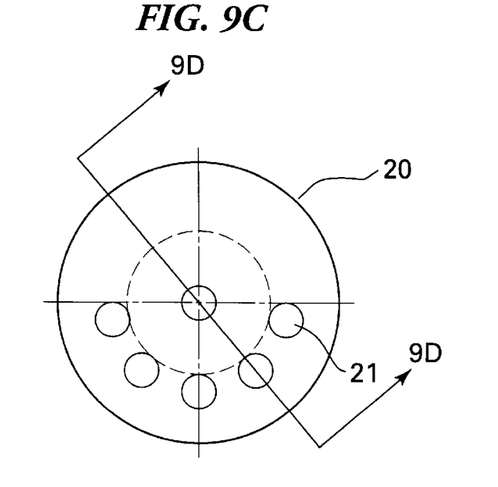
FIG. 9C is a top view of the adjustable ventilation system and the lower vent cap.
Figure 9D:
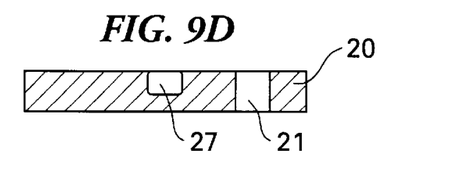
FIG. 9D is a cross sectional view taken along line 9D—9D of FIG. 9B.

In the preferred embodiment, the upper ventilation cap 17 has five ventilation holes 19 and the lower ventilation cap 20 has five ventilation holes 21 (see FIG. 9B). Alternatively, the upper ventilation cap 17 and the lower ventilation cap 20 may contain more or less ventilation holes in the upper ventilation cap 17 and the lower ventilation cap 20 provided the holes are dimensioned equal in number and adjustable to allow the proper venting of steam from and retention of moisture within the cooking vessel 10 as the five holes, respectively. The combination of the ventilation holes 19 and the ventilation holes 21 coact to regulate and control the amount of steam that escapes from the cooking vessel 10 and, therefore, the amount of moisture that is retained within the cooking vessel 10. By rotating the upper ventilation cap 17 with respect to the fixed lower ventilation cap 20, the alignment of ventilation holes 19 and 21 is controlled and provides six primary positions: the open position, defined by five holes open; the partially open or partially closed position defined by four holes open, three holes open, two holes open, one hole open; and the closed position, defined by no holes open. For example, when all five of the ventilation holes 19 are aligned with all five ventilation holes 21, the ventilation system 13 is in the fully open position. The fully open position provides for the maximum amount of release or venting of steam from the cooking vessel 10. When less than all five or at least a part of one of the ventilation holes 19 is aligned with less than all five or at least part of one of the ventilation holes 21, the ventilation system 13 is in the partially open or partially closed position. The partially open or partially closed position provides for a reduced amount of release or venting of steam in comparison to the fully open position. Lastly, when none of the ventilation holes 19 are aligned with any of the ventilation holes 21, the ventilation system 13 is in the closed position. The closed position does not permit the release or venting of any steam from the cooking vessel 10. The cooking results achieved from the six primary positions is discussed in further detail below.

The cooking vessel 10 is made of a ceramic material such as pottery, stoneware, and porcelain. Such a ceramic material allows cooking of food in any microwave oven, conventional oven, or microwave/convection oven of up to and including four hundred and fifty (450) degrees Fahrenheit. If the water absorption in the ceramic is less than five tenths of a percent (0.5%), the material is stoneware. If the water absorption in the ceramic is greater than five tenths of a percent (0.5%), the material is porcelain. Preferably, the cooking vessel 10 is made of porcelain as porcelain is lighter in weight, is whiter in appearance, and provides a more formal, refined appearance than the stoneware material.

Figure 2:
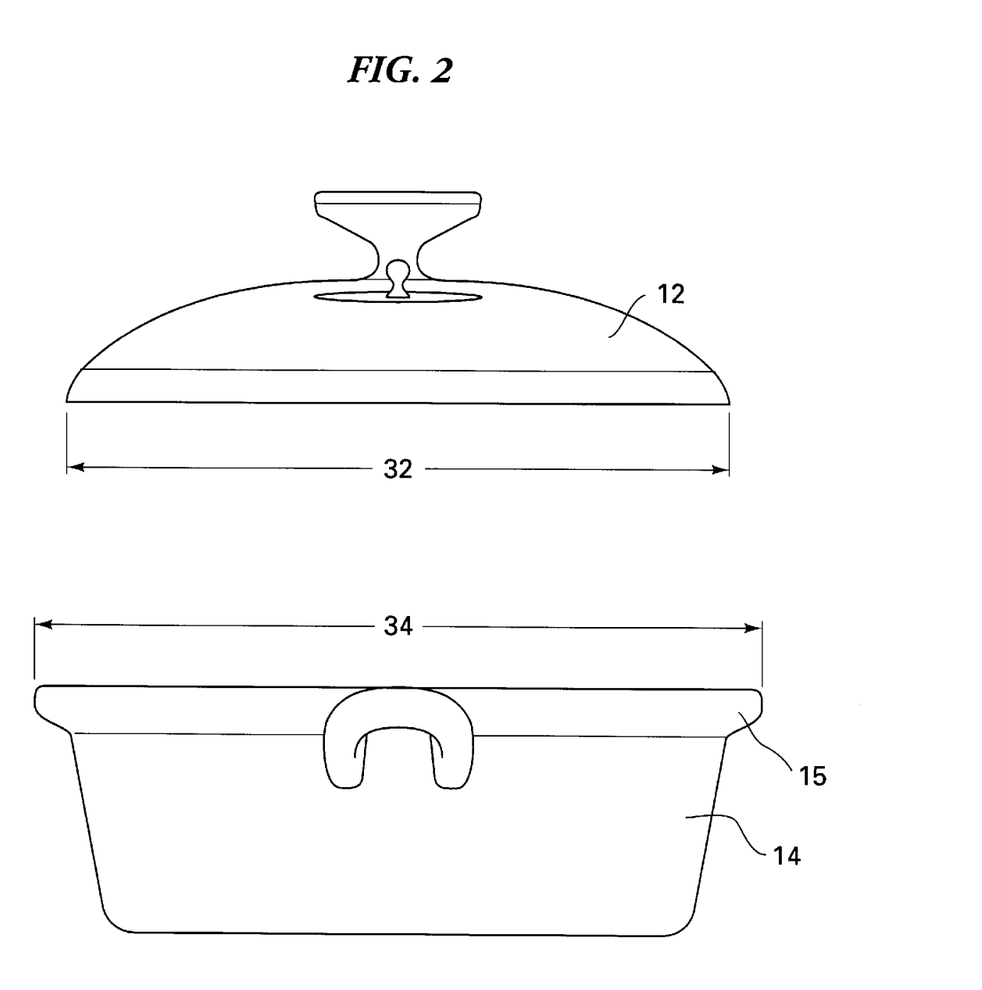
FIG. 2 is a side exploded view of the cooking vessel with the lid detached from the base.
Figure 3:
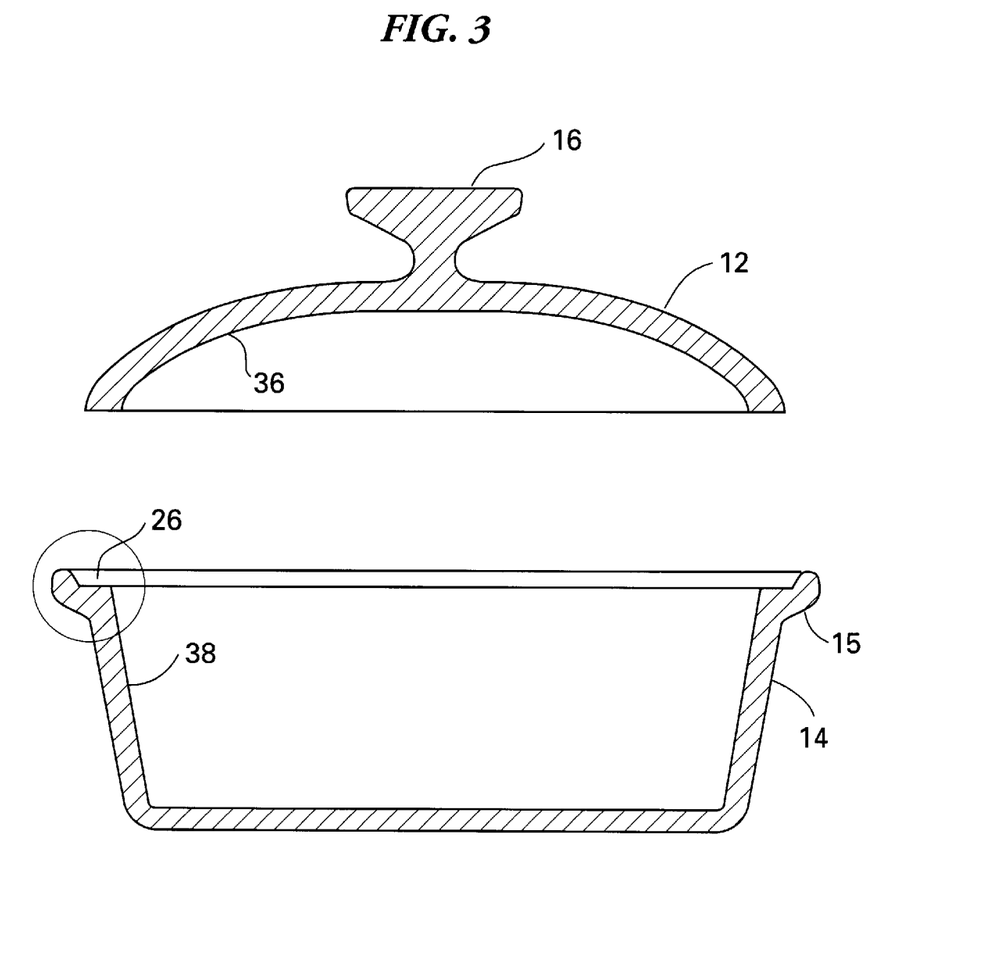
FIG. 3 is a side cross sectional view of the cooking vessel with the lid detached from the base of FIG. 2.

In FIG. 2, the cooking vessel 10 is illustrated with the lid 12 as shown removed from the base 14. The lid 12 has a lid circumference 32 and the base 14 has a base circumference 34. Preferably, the lid circumference 32 is slightly smaller than the base circumference 34 to receive the lid 12. FIG. 3 is a cross section of the cooking vessel 10 of FIG. 2 and further illustrates how the base 14 receives the lid 12. The base 14 has a lip 26 which is formed along the top of the inner surface of the bottom flange 15. Preferably, the lip 26 has a flat surface and has a width sufficient to receive and support the lid 12. In the preferred embodiment, the lid 12 has a lid underside 36 and the base 14 has a base innerside 38 that become approximately flush when the lid 12 is received by the base 14 to create a seal between the lid 12 and the base 14. This seal allows the moisture which condenses on the lid underside 36 of the lid 12 during cooking to drip back along the lid underside 36 to the base innerside 38 of base 14 and, thereby, further aids in the cooking of the food by permitting the warm moisture to circulate throughout the cooking vessel 10.

Figure 4:
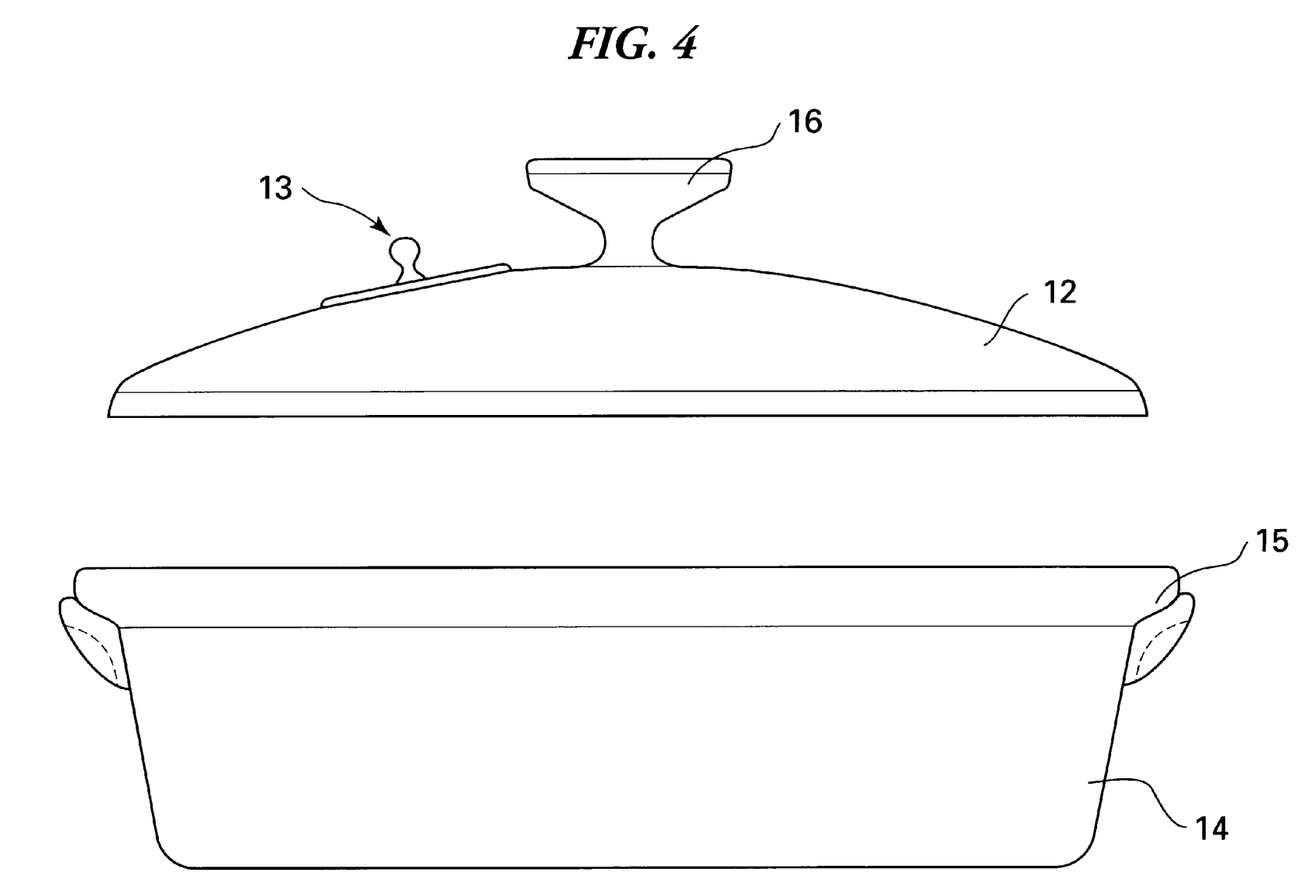
FIG. 4 is a front exploded view of the cooking vessel with the lid detached from the base.

In FIG. 4, the cooking vessel 10 is illustrated with the lid 12 as shown removed from the base 14. In particular, the ventilation system 13 provided in the lid 12 is illustrated. Preferably, the ventilation system 13 is located near the peak of the lid 12 and adjacent to the top knob handle 16. As steam rises from the base 14, this location for the ventilation system provides the most efficient release for the steam. Alternatively, the ventilation system 13 may be positioned anywhere along the lid 12. It is also contemplated that the ventilation system 13 may be positioned along the sides of the base 14 so long as the position does not interfere with the juices in the bottom of the base 14.

Figure 5:
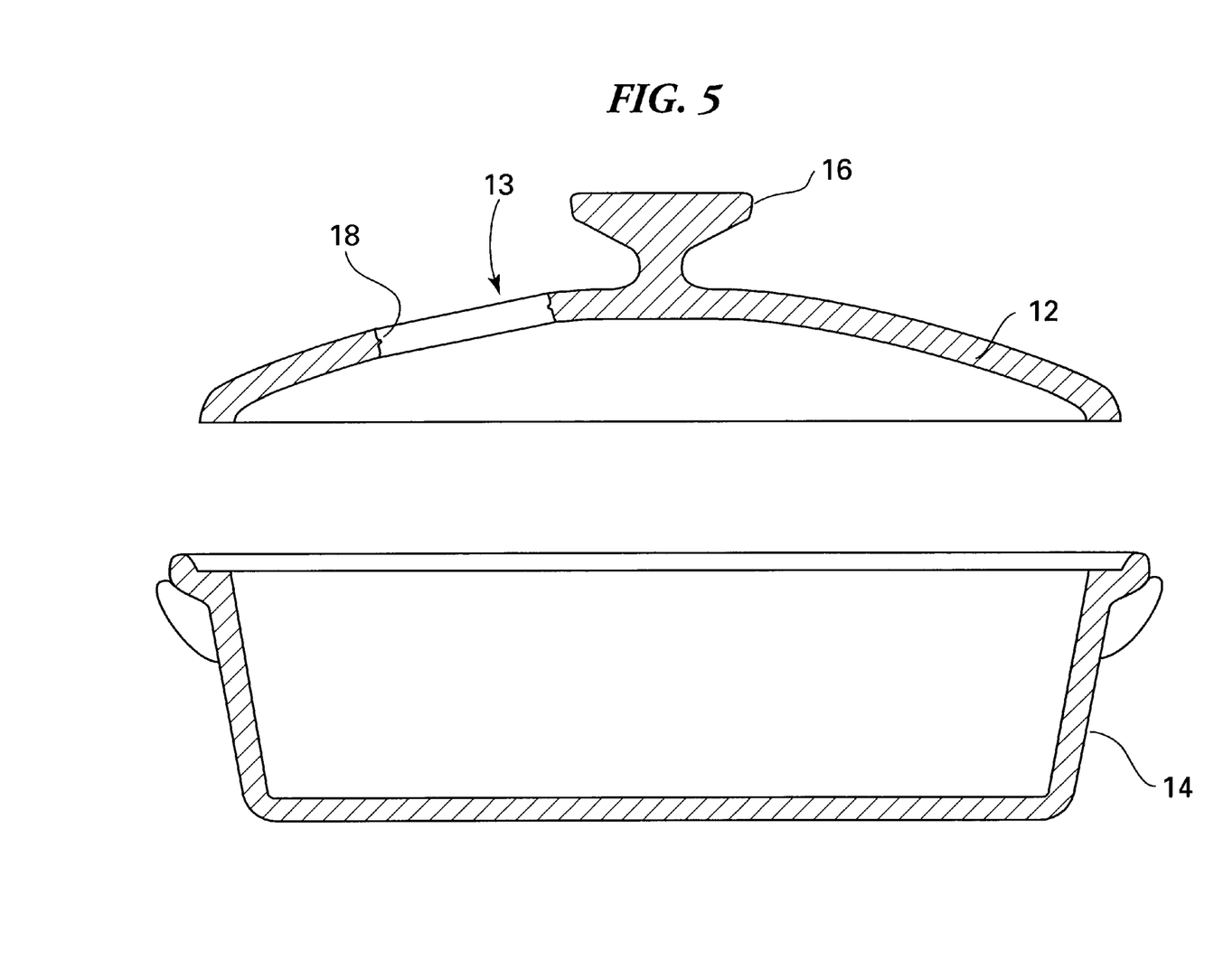
FIG. 5 is a front cross sectional view of the cooking vessel with the lid detached from the base of FIG. 4.

FIG. 5 is a cross section of the cooking vessel 10 of FIG. 4 with the ventilation system 13 removed, which more clearly illustrates the mounting of the ventilation system 13 within the lid 12. The lid 12 has an opening 18 to insert and mount the ventilation system 13. The upper ventilation cap 17 and the lower ventilation cap 20 are retained inside the opening 18 with the upper ventilation cap 17 positioned above the lower ventilation cap 20. The upper ventilation cap 17 and the lower ventilation cap 20 permit the steam to escape from the cooking vessel 10 through the opening 18 when the ventilation holes 19 and ventilation holes 21 are aligned in the fully open position or the partially open or partially closed positions.

Figure 6:
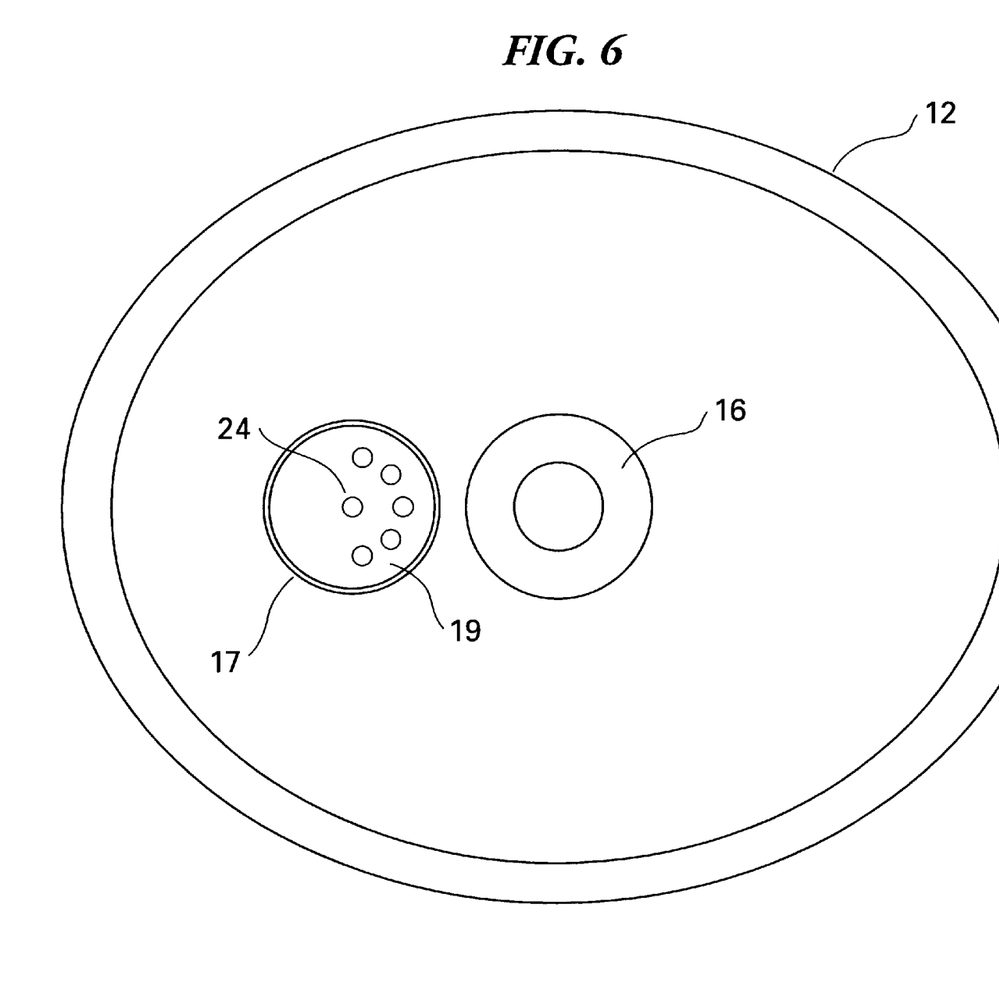
FIG. 6 is a top view of the lid of the cooking vessel depicting the adjustable ventilation system.

FIG. 6 is a top view of the lid 12 depicting the upper ventilation cap 17 and the ventilation holes 19 positioned therein. Preferably, the upper ventilation cap 17 is circular in shape with the ventilation holes 19 located around the periphery of the upper ventilation cap 17. In the preferred embodiment, the ventilation holes 19 consist of five holes, approximately one quarter (¼) of an inch or 64 millimeters in diameter, each equally spaced from one another and positioned equally along the outer periphery of the upper ventilation cap 17. Preferably, the ventilation holes 19 are situated on the same side of the upper ventilation cap 17 and within one hundred and eighty degrees (180°) of the two outside holes. Alternatively, the upper ventilation cap 17 may be a shape other than circular and the ventilation holes 19 may be located and positioned differently so long as the upper ventilation cap 17 may be rotated or moved in such a manner as to permit the corresponding alignment of the ventilation holes 19 with the ventilation holes 21 to achieve the six primary positions. In the circular embodiment, the vent knob handle 24 is located in the center of the upper ventilation cap 17 to permit easy rotation of the upper ventilation cap 17 with respect to the lower ventilation cap 20.

Figure 7:
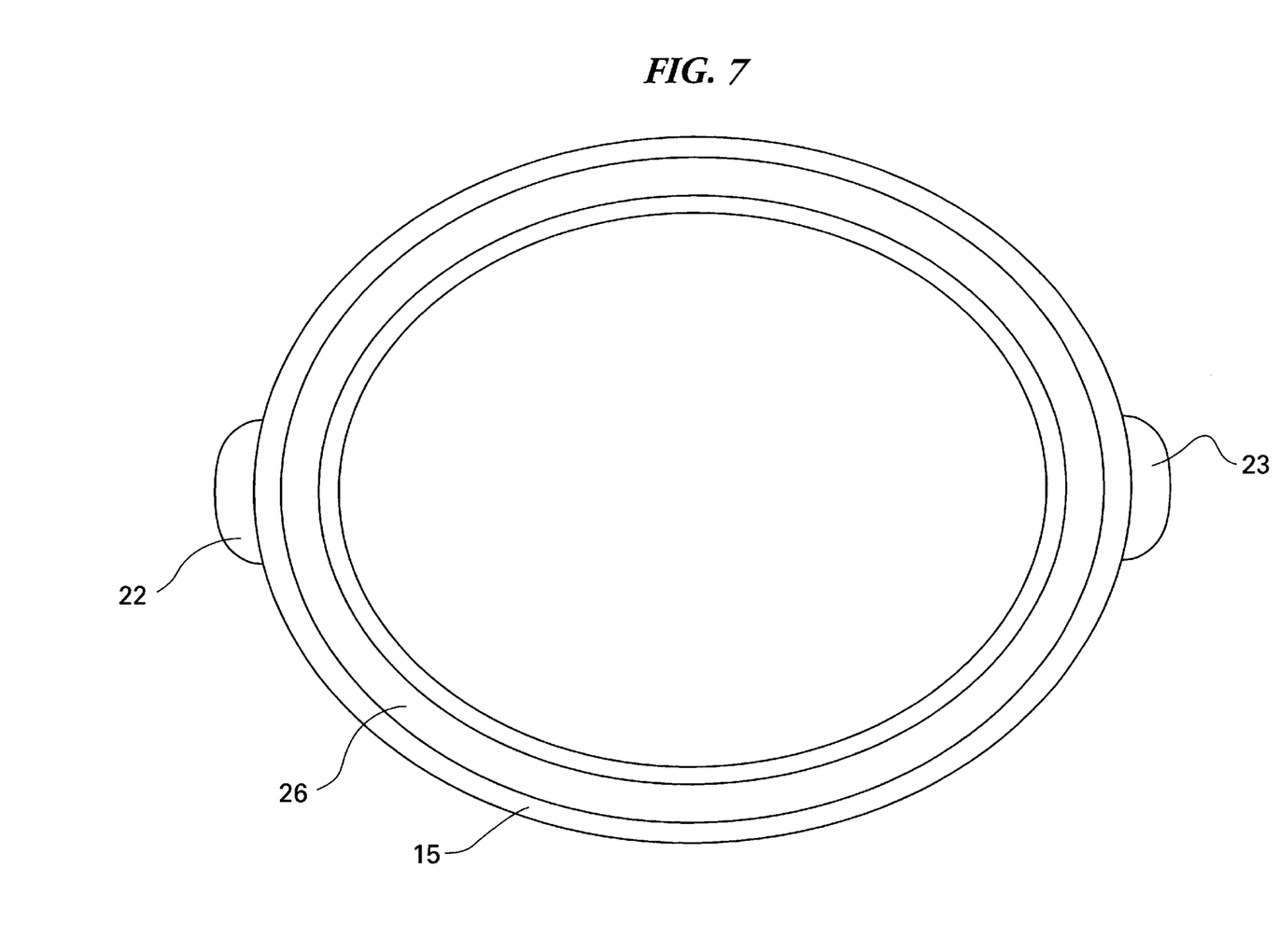
FIG. 7 is a top view of the base of the cooking vessel.

FIG. 7 is a top view of the base 14 showing the extending top flange 15 and the lip 26 that combine to secure the lid 12 to the base 14. The handles 22 and 23 are affixed to the exterior of the base 14 and located on opposite sides of the base 14 to permit ease in handling the cooking vessel 10 and inserting and removing the cooking vessel 10 from the microwave or oven. Preferably, the lid 12 and the base 14 are oval in shape. The oval shape eliminates corners or edges and, thereby, minimizes the circulation turbulence of the steam and moisture within the cooking vessel 10. This enables a more uniform circulation of the moisture that is retained within the cooking vessel 10 to cook the food. Alternatively, it is contemplated that a circular shape would be acceptable.

Figure 8:
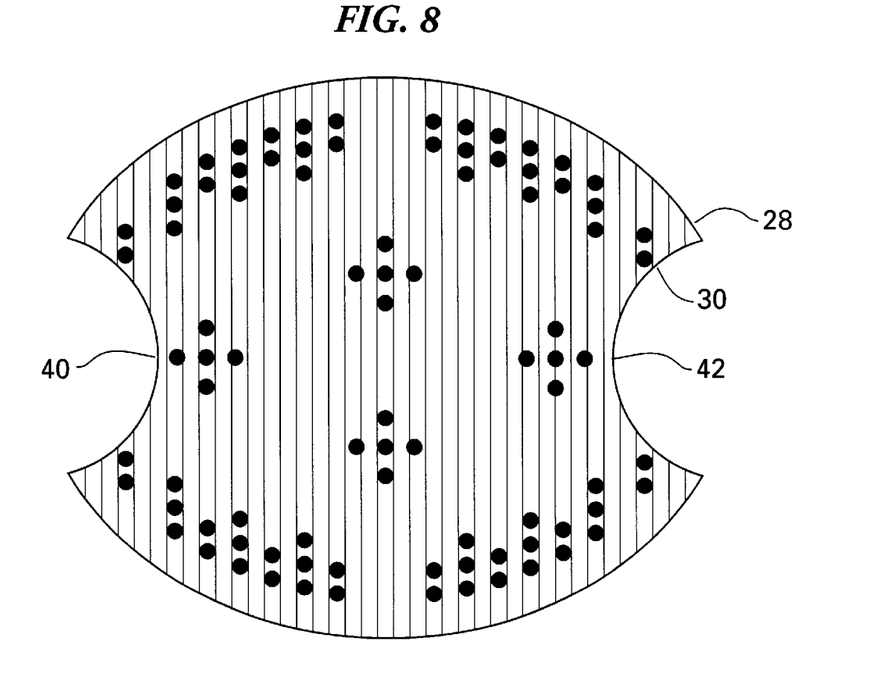
FIG. 8 is a top view of the rack that suspends the food within the cooking vessel.
Figure 8A:
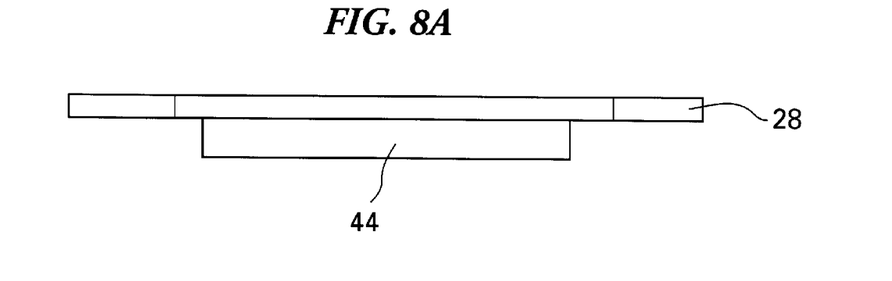
FIG. 8A is a side elevation view of the rack of FIG. 8.

FIG. 8 illustrates a rack 28 that is designed to fit into the bottom of the base 14. The rack 28 has an oval shape and a surface area that approximates the shape and surface area of the base 14. This larger surface area permits the rack 28 to support the largest amount of food that is capable of being received into the base 14 and cooked in the cooking vessel 10. The rack 28 has crescent indentations 40 and 42 to provide for easy insertion and removal of the rack 28 from the base 14. The rack 28 has perforations 30 placed therein. The perforations 30 allow: (1) the moisture created from the juices and the heat to rise into direct contact with the maximum surface area of the food, and (2) the juices emanating from the food to drip into the bottom of the base 14 for recirculation and use in cooking the food. In the side view of FIG. 8A, the rack 28 is shown supported by an edge 44. The edge 44 has feet that raise the rack 28 approximately one half (½) of an inch above the base 14. The spacing of rack 28 from the bottom of the base 14 by the edge 44 enables the proper circulation of moisture and juices between the bottom of the food on the rack 28 and the bottom of the base 14.

FIGS. 9A through 9D are top and cross sectional views of the upper ventilation cap 17 and the lower ventilation cap 20 that more clearly illustrate the positioning of the ventilation holes 19 and ventilation holes 21, respectively. Preferably, the circumference of the upper ventilation cap 17 is approximately equal to the circumference of the lower ventilation cap 20 and the diameter of the ventilation holes 19 are approximately equal to the diameter of the ventilation holes 21.

In the preferred embodiment, vent knob handle 24 has a stem 25 that is integrally molded into the upper ventilation cap 17. The stem 25 is permanently received in opening 27 of the lower ventilation cap 20 such that the upper ventilation cap 17 is not removable from the lid 12. This attachment of the upper ventilation cap 17 to the lower ventilation cap 20 is similar to the ball and socket type technology. In this stationary embodiment, the upper ventilation cap 17 is secured to the lower ventilation cap 20 with the stem 25 being permitted to rotate within the opening 27 and, thereby, permit the alignment of the ventilation holes 19 of the upper ventilation cap 17 with respect to the ventilation holes 21 of the lower ventilation cap 20.

Figure 9E:
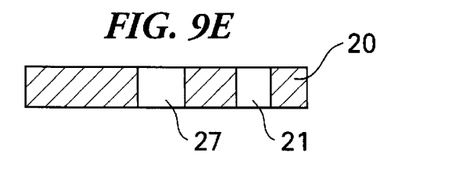
FIG. 9E is a cross sectional view of an alternate embodiment of the lower ventilation cap.
Figure 9F:
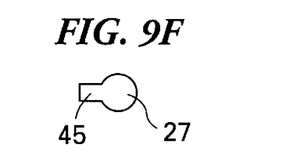
FIG. 9F is a top view of the alternate embodiment of FIG. 9E depicting the central keyway.
Figure 9G:
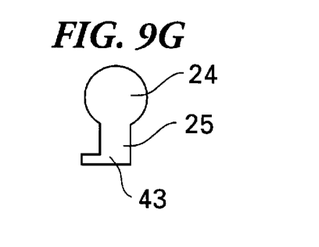
FIG. 9G is a side view of an alternate embodiment of the key and stem of the upper ventilation cap with portions removed.

In an alternate embodiment as illustrated in FIG. 9E, it is contemplated that the upper ventilation cap 17 may be removably attached to the lower ventilation cap 20. In this removable embodiment, the attachment of the upper ventilation cap 17 to the lower ventilation cap 20 is accomplished by a key and a key hole type technology. For example, as illustrated in FIG. 9G, the stem 25 is designed as any type of key 43 which is then inserted into the opening 27 and a corresponding receiving key hole 45 (See FIG. 9F). Upon proper insertion, the stem 25 and the key 43 are permitted unlimited rotation within the opening 27 and the key hole 45, respectively, to, thereby, permit the alignment of the ventilation holes 19 of the upper ventilation cap 17 with the ventilation holes 21 of the lower ventilation cap 20. In this alternate embodiment, the upper ventilation cap 17 will only be permitted to be released from the lower ventilation cap 20 when the key 43 and key hole 45 are correspondingly aligned. In this manner, the upper ventilation cap 17 is completely removable from the lower ventilation cap 20 and the lid 12. Alternatively, it is contemplated that any other type or form of key and key hole embodiment is acceptable to releasably attach the upper ventilation cap 17 to the lower ventilation cap 20. An advantage of this removable embodiment is that if the vent knob handle 24 is broken, it permits the upper ventilation cap 17 to be individually replaced rather than having to replace the whole lid 12 as in the stationary embodiment.

Figure 10:
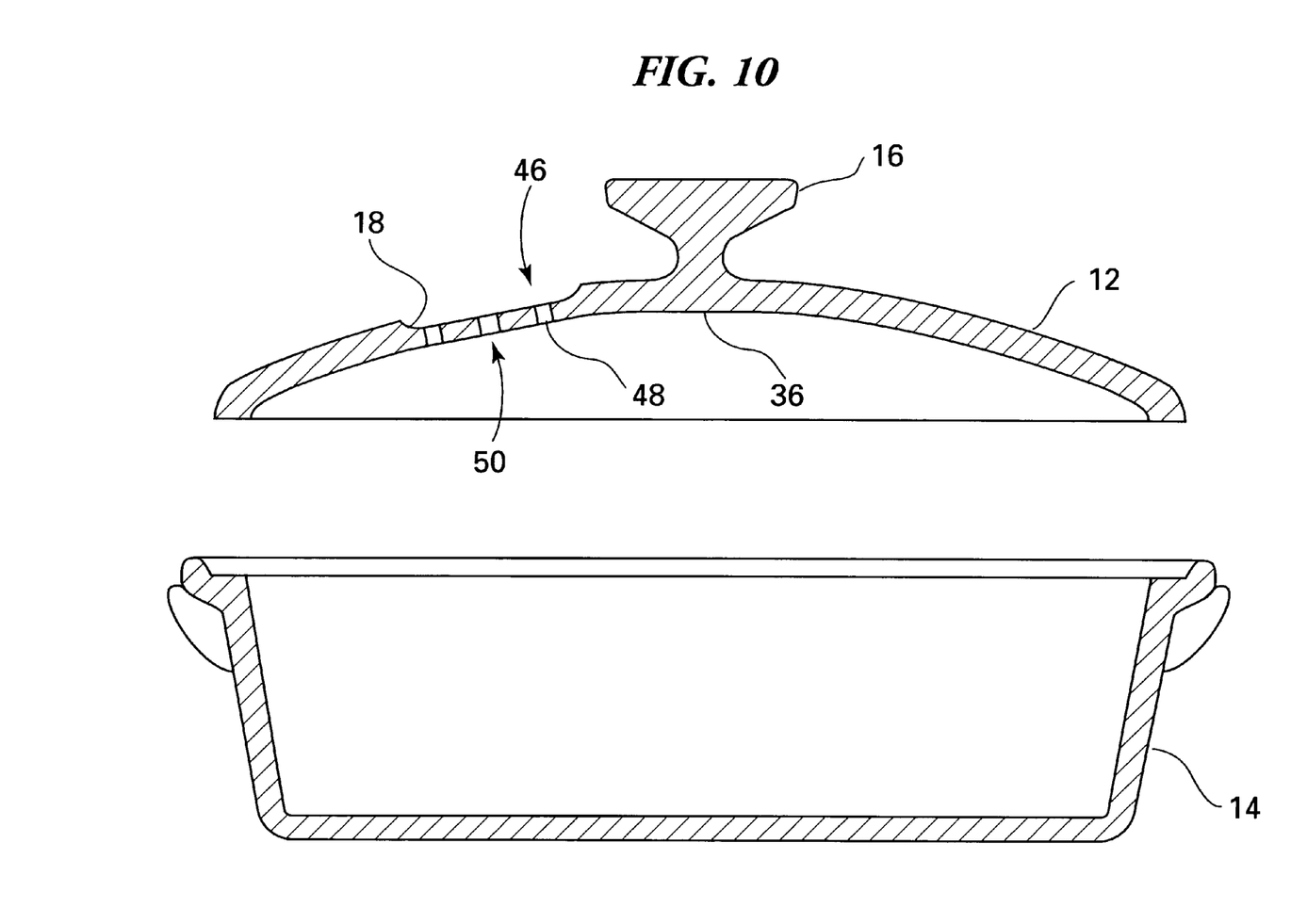
FIG. 10 is a front cross sectional view of an alternate embodiment of the ventilation system of the cooking vessel with the lid detached from the base.

In an alternate preferred embodiment with respect to the adjustable ventilation system as illustrated in FIG. 10, the lid 12 is provided with a recess 46 rather than an opening 27 to eliminate the need for a lower ventilation cap 20. The recess 46 is designed to provide and accommodate the same purposes and objectives as the original embodiment, except that the recess 46 provides for more efficient manufacturing and use.

Figure 11:
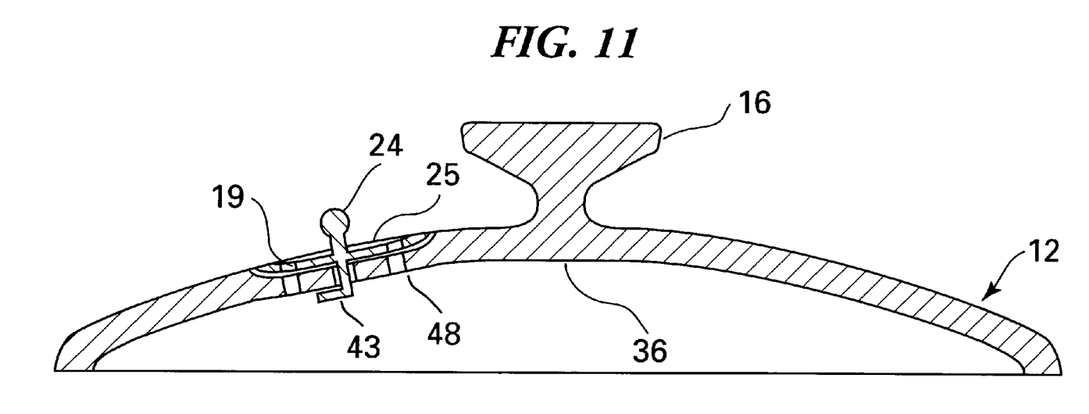
FIG. 11 is a front cross sectional view of the alternate embodiment as assembled with the upper ventilation cap.

The recess 46 is located in the same position as the opening 27. The recess 46 provides ventilation holes 48 and a central keyway 50. In the preferred embodiment, the recess 46 has five ventilation holes 48. Alternatively, the recess 46 may contain as few as three or as many as six ventilation holes 48. The recess 46 enables the upper ventilation cap 17 to be releasably secured to the lid 12 by the central keyway 50. The upper ventilation cap 17, containing a like number of ventilation holes 19, is set inside the recess 46 with the stem 25 and the key 43 being received into the central keyway 50 until the key 43 extends beyond the lid underside 36 as illustrated in FIG. 11. The stem 25 and the key 43 are permitted unlimited rotation within the central keyway 50. This enables the ventilation holes 19 of the upper ventilation cap 17 to align with the ventilation holes 48 of the lid 12. In this manner, the upper ventilation cap 17 will only be permitted to be released from the lid 12 when the key 43 and central keyway 50 are correspondingly aligned.

Figure 12:
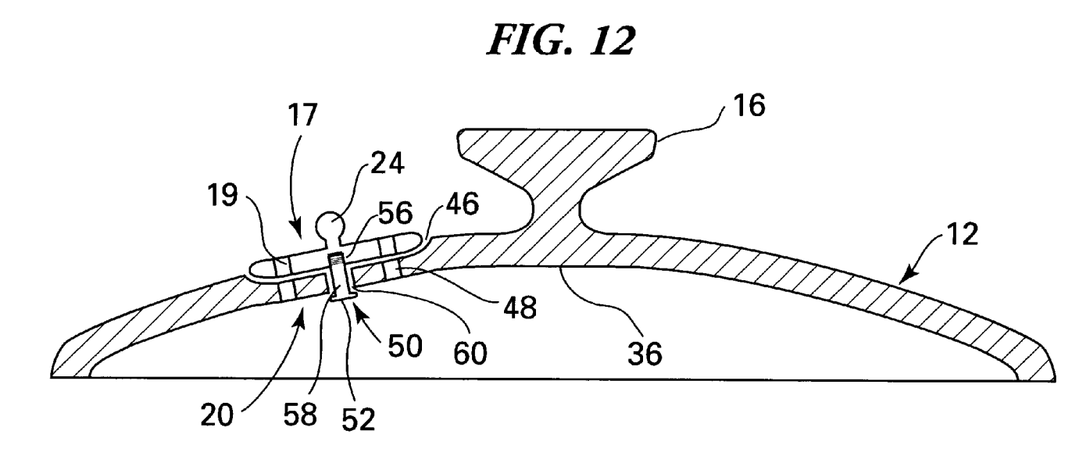
FIG. 12 is a front cross sectional view of the alternate ebodiment as assembled with a removable upper ventilation cap.

In still another alternate embodiment as illustrated in FIG. 12, another means is contemplated to removably attach the upper ventilation cap 17 to the lid 12. In this embodiment, the attachment of the upper ventilation cap 17 to the lid 12 is accomplished from tightening the upper ventilation 17 to the lid 12 by a securing means located on the lid underside 36.

In a nonlimiting example of FIG. 12, a screw 50 is used as the securing means. Alternatively, any other means may be used provided the result is the same. The screw 50 has a screw head 52 and a screw stem 54 that extends a distance perpendicular from the screw head 52 to reach the upper ventilation cap 17. The screw stem 54 consists of a threaded top 56 and a smooth bottom 58. The upper ventilation cap 17 has a threaded bore 60 to receive the threaded top 56 of the screw 50. The lid 12 is provided with an open channel 62 within the recess 46 to permit the attachment of the upper ventilation cap 17 to the screw 50.

To secure the upper ventilation cap 17 to the lid 12, the upper ventilation cap 17 is positioned into the recess 46 of the lid 12 with the threaded bore 60 being aligned with the open channel 62 of the lid 12. Preferably, the open channel 62 is centrally located within the recess 46 of the lid 12. The screw 50 is inserted from the lid underside 36 with the screw stem 54 being inserted through the open channel 62 and directly into the threaded bore 60 of the upper ventilation cap 17. The threaded top 56 of the screw 50 is threaded into the corresponding threaded bore 60 of the upper ventilation cap 17 until the screw 50 is secured to the upper ventilation cap 17. The smooth bottom 58 of the screw 50 freely rotates within the open channel 62. The smooth bottom 58 has a length which is slightly larger than the length of the open channel 62.

Upon securing the upper ventilation cap 17 to the screw 50, the screw head 52 is in close proximity to the lid underside 36 while allowing the upper ventilation cap 17 to rotate in the recess 46 to align the ventilation holes 19 of the upper ventilation cap 17 with the ventilation holes 48 of the lid 12 discussed infra. The screw head 52 also has a diameter that is greater than the diameter of the open channel 62 preventing the upper ventilation cap 17 from detaching from the lid 12 when secured to the screw 50.

In use and through extensive experimentation and testing, the combination of the cooking vessel 10 with the ventilation system 13 provides a unique cooking system that uniformly controls the heating pattern of the retained moisture. The ventilation system 13 provides excellent versatility to efficiently and properly cook a variety of foods through six primary hole positions to achieve optimum end product results for the particular foods and tastes. For example, in the open position, defined by five holes open, the maximum amount of steam or moisture is released from the cooking vessel 10. Approximately eight-five (85) percent of the steam within the cooking vessel 10 is released or permitted to escape. With such a large release, the remaining fifteen (15) percent of moisture retained in the cooking vessel 10 alleviates soggy results and provides increased tenderness in the food. This five open hole position is ideal for cooking chicken, cornish hens, duck and pheasant, casseroles with crumb or corn bread toppings, and desserts such as apple crisp and brownies.

In the partially open or partially closed position defined by four holes open, approximately eighty (80) percent of the steam within the cooking vessel 10 is released or permitted to escape. The remaining twenty (20) percent of moisture retained in the cooking vessel 10 also alleviates soggy results and is ideal for cooking a wide variety of recipes such as chili, lasagna, hamburger helper, bisquick pot pies, kasha, and couscous.

In the partially open or partially closed position defined by three holes open, approximately fifty (50) percent of the steam within the cooking vessel 10 is released or permitted to escape. The remaining fifty (50) percent of moisture retained in the cooking vessel 10 is ideal for cooking different kinds of fish such as salmon, white fish, scrod, and red snapper. This three hole position is also ideal for cooking all kinds of rice recipes and vegetables such as broccoli, egg plant, spinach, and vegetable medleys.

In the partially open or partially closed position defined by two holes open, approximately thirty (30) percent of the steam within the cooking vessel 10 is released or permitted to escape. The remaining seventy (70) percent of moisture retained in the cooking vessel 10 is ideal for cooking drier recipes and vegetables that are low in water content such as carrots, green beans, and lima beans. This two hole position is also ideal for reheating larger quantities of food such as casseroles, meats, and soups.

In the partially open or partially closed position defined by one hole open, approximately twenty (20) percent of the steam within the cooking vessel 10 is released or permitted to escape. The remaining eighty (80) percent of moisture retained in the cooking vessel 10 is ideal for reheating small quantities of food without drying out the food.

Lastly, in the closed position, defined by no holes open, substantially all the moisture is retained in the cooking vessel 10. This closed position is ideal for reheating foods that are particularly susceptible to becoming dry during cooking. This closed position is also advantageous to preserve the freshness and flavor of leftovers in a refrigerator for up to three (3) days and is capable of serving the food hot five (5) to eight (8) minutes after removed from the microwave or oven.

Alternatively, it is contemplated with respect to the four partially open or partially closed positions that the ventilation holes 19 of the upper ventilation cap 17 may be aligned to partially close the ventilation holes 21 of the lower ventilation cap 20 to achieve other desired tastes. For example, the ventilation holes 19 may be aligned with the ventilation holes 21 to provide a partially open or partially closed position of a half (½) open hole, a one and a one half (1½) open hole, and a two and one half open hole (2½).

Thus, there has been provided a cooking vessel with a unique adjustable ventilation system for effectively and efficiently cooking various foods and obtaining desired tastes. While the invention has been described in conjunction with a specific embodiment, it is evident that many alternatives, modifications and variations will be apparent to those skilled in the art in light of the foregoing description. Accordingly, it in intended to embrace all such alternatives, modifications and variations as fall within the spirit and scope of the appended claims.

What is claimed is:

1. A cooking vessel for use in a conventional oven, microwave oven, or convection oven with an adjustable ventilation system, comprising:
   a ceramic base having a top, a bottom, an interior, and an exterior and a pair of handles extending outwardly from the exterior of the base;
   means in the bottom of the base for supporting food thereon;
   a removable lid adapted to be received by the top of the base, the lid having a top and a bottom;
   a recess portion in the top of the lid, the recess portion having a plurality of ventilation holes and an open channel extending from the top to the bottom of the lid, the plurality of ventilation holes being equally spaced from adjacent ventilation holes with all of the plurality of ventilation holes being positioned on the recess portion within an arc of less than one hundred and eighty degrees;
   grasping means extending upward from the top of the lid for holding and removing the lid;
   a ventilation cap rotatably secured to the top of the lid within the recess, the ventilation cap having a vent knob handle and a plurality of ventilation holes, the plurality of ventilation holes being equally spaced from adjacent ventilation holes with all of the plurality of ventilation holes being positioned on the ventilation cap within an arc of less than one hundred and eighty degrees, the ventilation cap rotating within the recess above the ventilation holes of the lid such that the plurality of ventilation holes of the ventilation cap are permitted to be sequentially aligned with the plurality of ventilation holes of the recess to enable a plurality of different cooking positions, each cooking position enabling the regulation of a different amount of steam or moist air to be released from the cooking vessel; and
   means for securing a ventilation cap to the lid within the recess.

2. The cooking vessel of claim 1 wherein the means for securing the ventilation cap to the lid is a screw, the screw having a head and a stem, the stem having a threaded top, the threaded top being releaseably received by the ventilation cap.

3. The cooking vessel of claim 1 wherein the plurality of ventilation holes in the recess and the plurality of ventilation holes in the ventilation cap is between three and six.

4. The cooking vessel of claim 3 wherein the plurality of ventilation holes in the recess and the plurality of ventilation holes in the ventilation cap is five.

5. A cooking vessel for use in a conventional oven, microwave oven, or convection oven with an adjustable ventilation system, comprising:
   a ceramic base having a top, a bottom, an interior, and an exterior and a pair of handles extending outwardly from the exterior of the base;
   a removable lid adapted to be received by the top of the base, the lid having a top and a bottom;
   a recess portion in the top of the lid, the recess portion having a plurality of ventilation holes and a central keyway extending from the top to the bottom of the lid, the plurality of ventilation holes being equally spaced from adjacent ventilation holes with all of the plurality of ventilation holes being positioned on the recess portion within an arc of less than one hundred and eighty degrees;
   grasping means extending upward from the top of the lid for holding and removing the lid;
   a ventilation cap rotatably secured to the top of the lid within the recess, the ventilation cap having a vent knob handle, a key, and a plurality of ventilation holes, the key of the ventilation cap releasably received within the central keyway, the plurality of ventilation holes being equally spaced from adjacent ventilation holes with all of the plurality of ventilation holes being positioned on the ventilation cap within an arc of less than one hundred and eighty degrees, the ventilation cap rotating within the recess above the ventilation holes of the lid such that the plurality of ventilation holes of the ventilation cap are permitted to be sequentially aligned with the plurality of ventilation holes of the recess to enable a plurality of different cooking positions, each cooking position enabling the regulation of a different amount of steam or moist air to be released from the cooking vessel.

6. The cooking vessel of claim 1 wherein the ceramic material is selected from the group consisting of stoneware and porcelain.

7. The cooking vessel of claim 2 wherein the ventilation cap and means for securing the ventilation cap is ceramic.

8. The cooking vessel of claim 1 wherein the lid is secured to the top of the base by a lip and a flange at the top of the base.

9. The cooking vessel of claim 1 wherein the plurality of different cooking positions consist of a five fully open hole position, a four open hole position, a three open hole position, a two open hole position, a one open hole position, and a closed position.

10. The cooking vessel of claim 1 wherein the means in the bottom of the base for supporting food is a rack and further comprising a plurality of perforations in the rack.

11. The cooking vessel of claim 1 and further comprising means on the rack for positioning the rack approximately one half of an inch above the bottom of the base.

12. The cooking vessel of claim 9 wherein the five fully open, hole position permits approximately eighty-five (85) percent of the steam within the cooking vessel to escape, in the four open hole position approximately eighty (80) percent of the steam within the cooking vessel is permitted to escape, in the three open hole position approximately fifty (50) percent of the steam within the cooking vessel is permitted to escape, in the two open hole position approximately thirty (30) percent of the steam within the cooking vessel is permitted to escape, and in the closed position approximately all of the steam is retained within the cooking vessel.

13. A cooking vessel for use in a conventional oven, microwave oven, or convection oven with an adjustable ventilation system, comprising:

a base having a top, a bottom, an interior, and an exterior and a pair of handles extending outwardly from the exterior of the base;

a removable lid adapted to be received by the top of the base, the lid having a top and a bottom and further defining an opening between the top and the bottom, the opening in the lid having a plurality of stationary ventilation holes, the lid further having a knob extending outwardly from the top of the lid;

a ventilation cap secured within the opening of the lid, the ventilation cap having a plurality of movable ventilation holes, the ventilation cap mounted for rotation with respect to the opening in the lid, the ventilation cap permitted to be rotated such that at least the first one of the plurality of movable ventilation holes is sequentially and completely aligned with any one of the stationary ventilation holes to enable at least three different cooking positions wherein none one or more of said stationary ventilation holes are opened to form the plurality of different cooking positions for enabling the regulation of a different amount of steam or moist air to be released from the cooking vessel.

14. The cooking vessel of claim 13 wherein all of the ventilation holes are approximately one quarter of an inch in diameter.

15. The cooking vessel of claim 13 wherein the cooking positions consist of a five fully open hole position, a four open hole position, a three open hole position, a two open hole position, a one open hole position, and a closed position.

16. A method for cooking food using an adjustable ventilation system, comprising the steps of:

providing a cooking vessel, the cooking vessel with a base having a top, a bottom, an interior, and an exterior and a pair of handles extending outwardly from the exterior of the base, a removable lid adapted to be received by the top of the base, the lid having a top and a bottom, a recess portion in the top of the lid, the recess portion having a plurality of ventilation holes and a central keyway extending from the top to the bottom of the lid, the plurality of ventilation holes being equally spaced from adjacent ventilation holes with all of the plurality of ventilation holes being positioned on the recess portion within an arc of less than one hundred and eighty degrees, grasping means extending upward from the top of the lid for holding and removing the lid, a ventilation cap rotatably secured to the top of the lid within the recess, the ventilation cap having a vent knob handle, a key, and a plurality of ventilation holes, the key of the ventilation cap releasably received within the central keyway, the plurality of ventilation holes being equally spaced from adjacent ventilation holes with all of the plurality of ventilation holes being positioned on the ventilation cap within an arc of less than one hundred and eighty degrees, the ventilation cap permitting unlimited rotation within the recess above the ventilation holes of the lid such that the plurality of ventilation holes of the ventilation cap are permitted to be aligned with the plurality of ventilation holes of the recess to enable a plurality of different cooking positions, each different cooking position enabling the regulation of a different amount of steam or moist air to be released from the cooking vessel;

removing the lid from a secured position on the base of the cooking vessel to expose the bottom of the base;

inserting a desired food into the exposed base of the cooking vessel;

placing the lid back in the secured position on the base to enclose the food within the cooking vessel;

rotating the upper ventilation cap relative to the recess to a desired cooking position with each of the ventilation holes of the upper ventilation cap being correspondingly aligned with a different ventilation hole of the lower ventilation cap to form the plurality of different cooking positions for enabling the regulation of a different amount of steam or moist air to be released from the cooking vessel and maintaining the proper moisture retention within the cooking vessel during the cooking of the food;

inserting the cooking vessel into an oven to cook the food; and removing the cooking vessel from the oven when the food is cooked to the desired degree.

17. The method of claim 16 wherein the plurality of ventilation holes in the recess and the plurality of ventilation holes in the ventilation cap is between three and six.

18. The method of claim 17 wherein the plurality of ventilation holes in the recess and the plurality of ventilation holes in the ventilation cap is five.

19. The method of claim 16 wherein the plurality of different cooking positions consists of a five fully open hole position in which approximately eighty-five (85) percent of the steam within the cooking vessel is permitted to escape, a four open hole position in which approximately eighty (80) percent of the steam within the cooking vessel is permitted to escape, a three open hole position in which approximately fifty (50) percent of the steam within the cooking vessel is permitted to escape, a two open hole position in which approximately thirty (30) percent of the steam within the cooking vessel is permitted to escape, and a closed position in which approximately all of the steam is retained within the cooking vessel.

* * * * *